(12) United States Patent
Forest

(10) Patent No.: US 11,432,914 B2
(45) Date of Patent: Sep. 6, 2022

(54) METHOD FOR MANUFACTURE OF A REMOVABLE DENTAL PROSTHESIS BY MOULDING WITH THE AID OF A MOULD FORMED BY ADDITIVE MANUFACTURE

(71) Applicant: CIRCLE ANATOSCOPE INTUITIVE DESIGN, Salon-de-Provence (FR)

(72) Inventor: Alexandre Forest, Bellegarde (FR)

(73) Assignee: CIRCLE ANATOSCOPE INTUITIVE DESIGN, Salon de Provence (FR)

( * ) Notice: Subject to any disclaimer, the term of this patent is extended or adjusted under 35 U.S.C. 154(b) by 375 days.

(21) Appl. No.: 16/314,072
(22) PCT Filed: Jun. 30, 2017
(86) PCT No.: PCT/FR2017/051782
§ 371 (c)(1),
(2) Date: Dec. 28, 2018
(87) PCT Pub. No.: WO2018/002562
PCT Pub. Date: Jan. 4, 2018

(65) Prior Publication Data
US 2019/0247167 A1  Aug. 15, 2019

(30) Foreign Application Priority Data
Jun. 30, 2016 (FR) ........................ 1656228

(51) Int. Cl.
*A61C 13/08* (2006.01)
*A61C 8/00* (2006.01)
(Continued)

(52) U.S. Cl.
CPC .......... *A61C 13/081* (2013.01); *A61C 8/0048* (2013.01); *A61C 13/0013* (2013.01);
(Continued)

(58) Field of Classification Search
CPC . A61C 13/0004; A61C 13/0013; A61C 13/04; A61C 13/081; A61C 13/1003;
(Continued)

(56) References Cited

U.S. PATENT DOCUMENTS 5,672,305 A * 9/1997 Kogure .................. A61C 13/04
249/54
7,153,135 B1  12/2006 Thomas
(Continued)

FOREIGN PATENT DOCUMENTS

CN  101548911 A  10/2009
EP  1 240 878 A1  9/2002
(Continued)

OTHER PUBLICATIONS

Office Action issued in European Patent Application No. 17 745 418.8 dated May 4, 2020 with English machine translation provided.
(Continued)

*Primary Examiner* — Yunju Kim
(74) *Attorney, Agent, or Firm* — Nixon & Vanderhye

(57) ABSTRACT

Disclosed is a method for manufacture of a removable dental prosthesis by moulding, the method including: digital modelling of a prosthesis model; a step of producing a mould including a lower half-shell corresponding to a tooth part of the prosthesis and an upper half-shell corresponding to a gum part of the prosthesis, the two half-shells being able to be joined together by affixing one to the other, thereby forming an impression of the prosthesis, the step including digital modelling of a model of the mould, followed by additive manufacture of at least the lower half-shell, and a step of producing the prosthesis, the step including in succession at least one provision of at least one artificial tooth, positioning of the artificial tooth in a seat of the lower
(Continued)

half-shell, assembling the mould and pouring a filler material into the mould. Also disclosed is a prosthesis obtained by this method.

13 Claims, 11 Drawing Sheets

(51) Int. Cl.
| | |
|---|---|
| *A61C 13/00* | (2006.01) |
| *A61C 13/01* | (2006.01) |
| *A61C 13/10* | (2006.01) |
| *A61C 13/16* | (2006.01) |
| *A61C 13/225* | (2006.01) |
| *B33Y 80/00* | (2015.01) |
| *B29C 64/00* | (2017.01) |

(52) U.S. Cl.
CPC .......... *A61C 13/04* (2013.01); *A61C 13/1003* (2013.01); *A61C 13/16* (2013.01); *A61C 13/2255* (2013.01); *B29C 64/00* (2017.08); *B33Y 80/00* (2014.12); *A61C 13/0004* (2013.01)

(58) Field of Classification Search
CPC ..... A61C 13/16; A61C 13/2255; A61C 13/26; A61C 8/0048; B29C 64/00; B33Y 80/00

USPC .......................................................... 264/19
See application file for complete search history.

(56) References Cited

U.S. PATENT DOCUMENTS

| | | | |
|---|---|---|---|
| 2015/0250568 A1* | 9/2015 | Fisker | A61C 9/0046 433/29 |
| 2016/0100917 A1* | 4/2016 | Howe | A61C 13/34 433/213 |

FOREIGN PATENT DOCUMENTS

| | | |
|---|---|---|
| EP | 2 465 465 A1 | 6/2012 |
| JP | 2000-333972 A | 12/2000 |
| WO | 2014/053549 A1 | 4/2014 |
| WO | 2015/120010 A1 | 8/2015 |

OTHER PUBLICATIONS

International Search Report for PCT/FR2017/051782 dated Oct. 5, 2017, 3 pages.

* cited by examiner

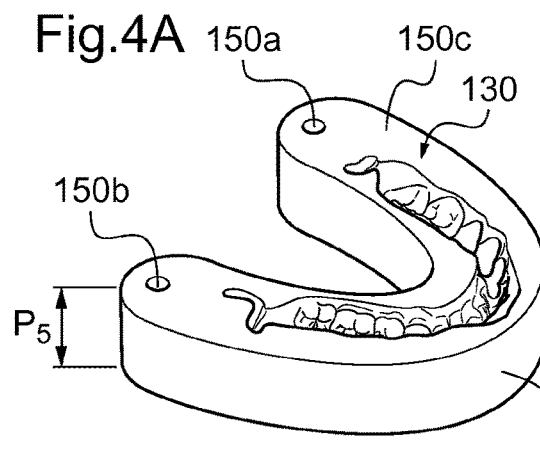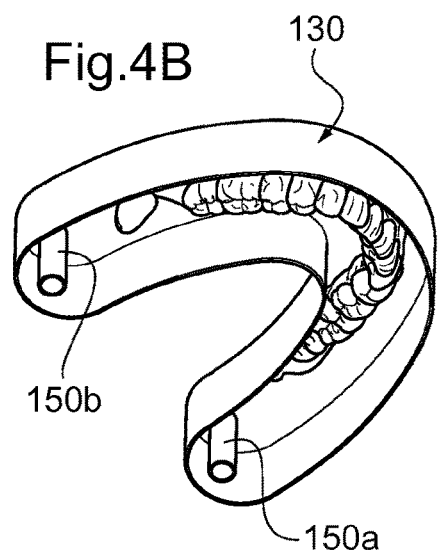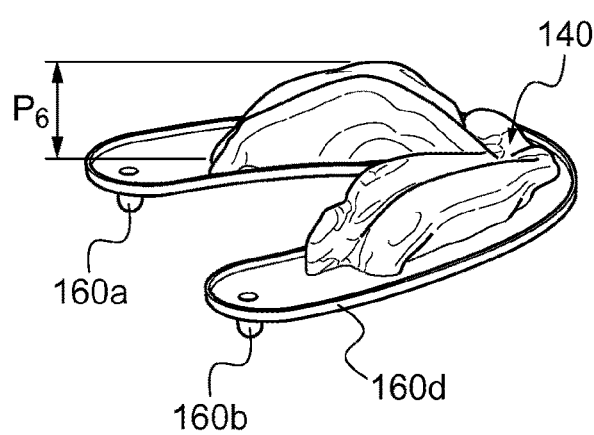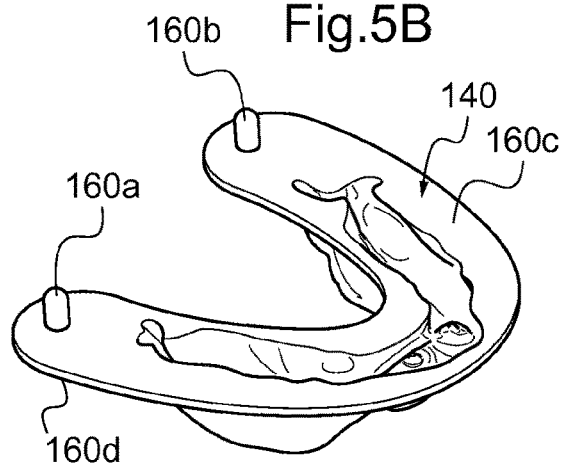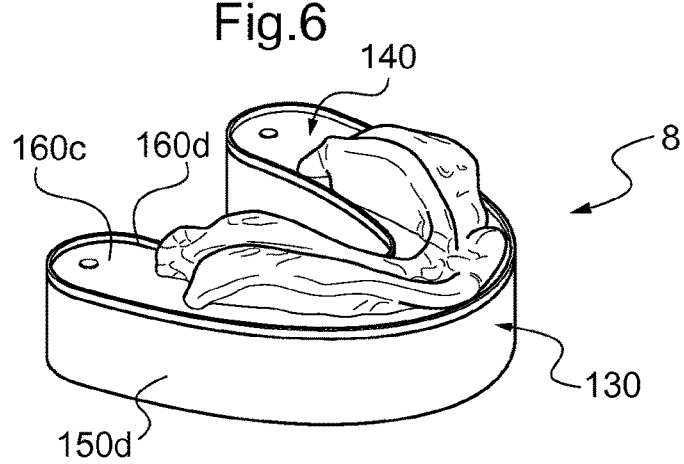

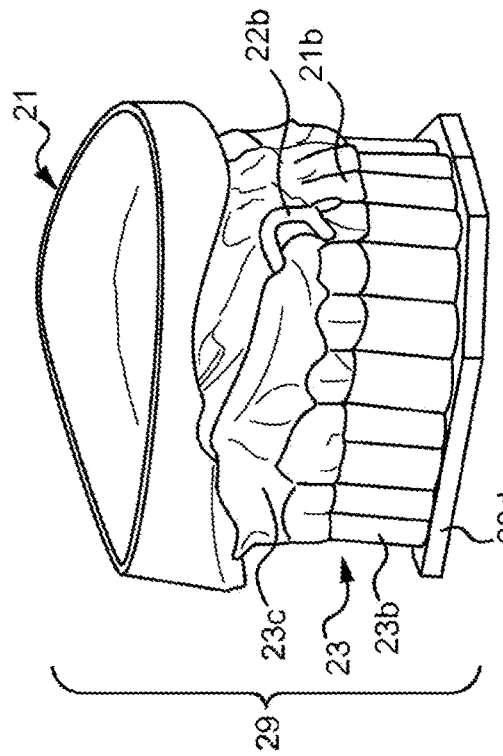
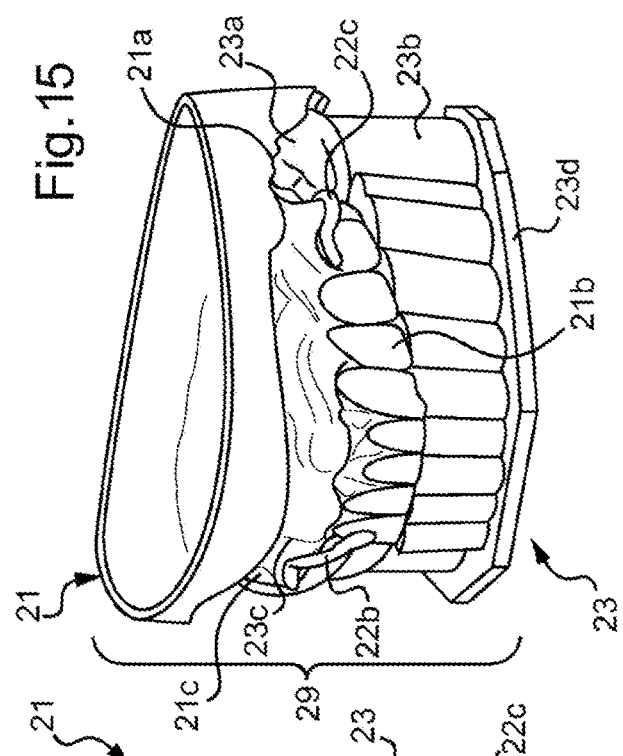
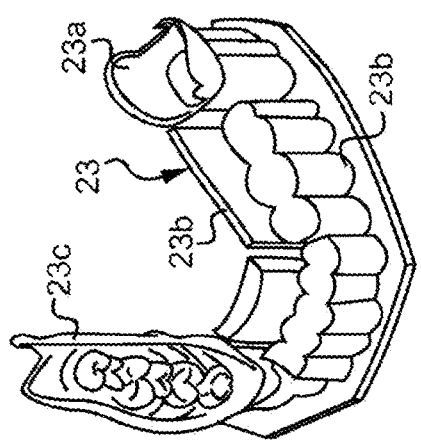
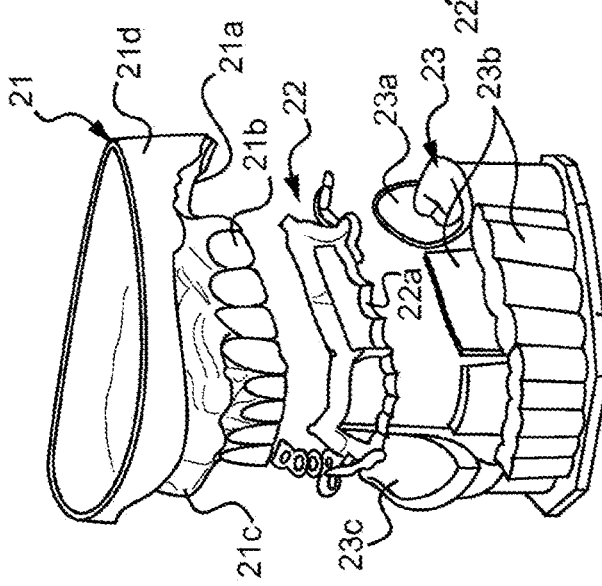

Fig. 26
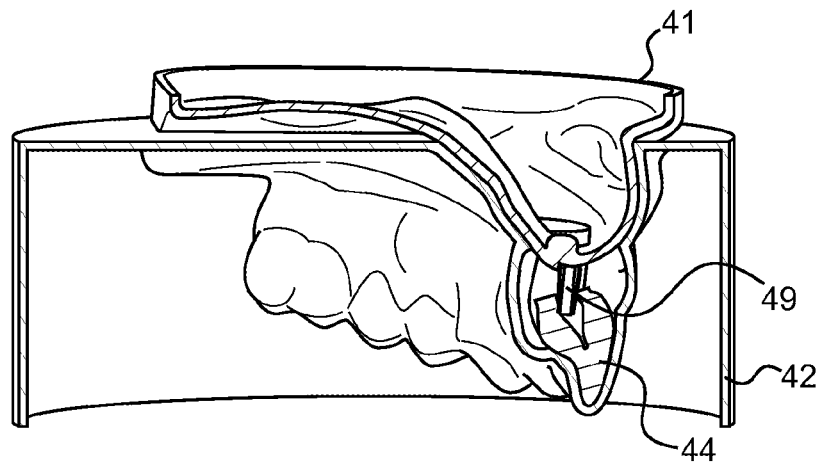
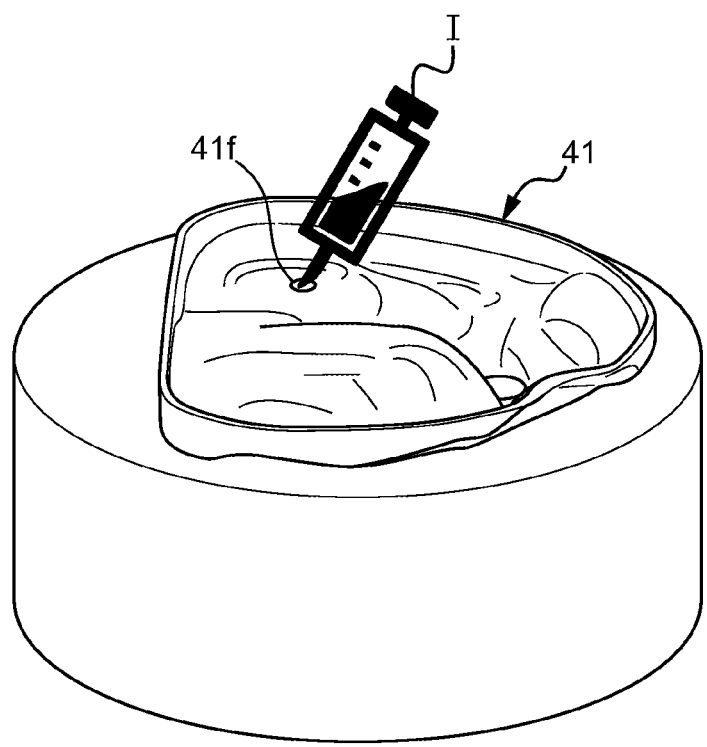
Fig. 27

METHOD FOR MANUFACTURE OF A REMOVABLE DENTAL PROSTHESIS BY MOULDING WITH THE AID OF A MOULD FORMED BY ADDITIVE MANUFACTURE

The present application concerns a method for manufacture of a removable dental prosthesis with the aid of a mould formed at least partly by additive manufacture.

It concerns more particularly a method for manufacture of a removable dental prosthesis by moulding.

DESCRIPTION OF THE RELATED ART

A dental prosthesis is an apparatus for replacing at least some of the natural teeth.

A removable prosthesis is a prosthesis which can be withdrawn from the mouth for example for its daily maintenance or quite simply to sleep but also by unscrewing of an implant.

The term removable complete prosthesis, or denture, is used when the prosthesis replaces the entirety of the teeth, whether it be of the upper jaw for an upper denture or the lower jaw for a lower denture.

The term removable partial prosthesis is used when only one or several teeth are replaced.

A removable partial prosthesis for example comprises a bar (or structure) for support (like a base) and a resin part typically of acrylic resin (gum and tooth or teeth). A metal base, or stellite, may thus support the artificial teeth which are positioned at the location of the missing teeth. This rigid metal-based part (usually based on chromium-cobalt-molybdenum) bears at the same time on the remaining teeth and on the mucosa, mainly the gums.

The removable partial prosthesis may also be a bridge, consisting of one or more suspended artificial teeth linked to remaining teeth or abutments. In this case, the support bar is of metal, ceramic, a mixture of metal and ceramic or of composite resin.

A removable prosthesis may also be held in place in the mouth by at least one implant. An implant is a metal member, possibly fastened via a screw, into the bone, in order to replace the root of a tooth. The metal currently used is most often titanium. The number of implants placed in the mouth is variable according to the size of said prosthesis. The presence of several implants most often necessitates the presence of a retaining bar which bears on the implants, the prosthesis itself then being attached to the retaining bar most often by at least one fastening means.

The manufacture of removable dental prostheses requires the implementation of a protocol comprising a succession of high-precision steps, among which: taking a primary imprint with analysis of the gum contours, taking a secondary imprint (or rework). At least two imprints are required to very accurately record the position of the gum, the tongue, the lips and the cheeks. These steps are mandatory before arriving at the step of casting the monomer (which will form the resin of the prosthesis) in a plaster mould, in which artificial teeth have been disposed in advance or else are bonded subsequently.

These are time-consuming steps which considerably delay the effective production of the prosthesis. Thus, it is typically necessary to conduct at least five clinical sessions before putting in place a removable complete prosthesis, comprising at least for example the taking of primary and secondary imprints, the intermaxilliary ratio, the trial of the wax assembly, the verification of occlusion and equilibration.

Furthermore, once the prosthesis is in place, if a problem arises, it is most often necessary to rework the secondary imprint to effect the necessary corrections.

Therefore, the manufacture of removable dental prostheses is a long, onerous, rebarbative process which puts off numerous dental prosthetists.

SUMMARY OF THE INVENTION

The aim of the present application is thus directed to providing a method that is improved, in particular in terms of time-saving and ease of manufacture, in a context of automation or even industrialization, of at least one removable dental prosthesis.

To that end, the invention concerns, according to a first aspect, a method for manufacture of a removable dental prosthesis by moulding, said method comprising the following successive steps:

a step of digital modelling of a prosthesis model, the prosthesis model representing the prosthesis to produce and comprising a gum part and a tooth part;

a step of producing a mould from the prosthesis model, said mould comprising two half-shells, a lower half-shell comprising an imprint of the tooth part of the prosthesis to produce, and an upper half-shell comprising an imprint of the gum part of the prosthesis to produce, the two half-shells being configured to be assembled by juxtaposition against each other, the imprints of each half-shell forming by assembly an imprint of the prosthesis to produce, the mould comprising at least one positioning member for positioning one half-shell relative to the other half-shell, The step of producing a mould comprising a sub-step of at least partial digital modelling of a mould model according to the prosthesis model, followed by a sub-step of additive manufacture of at least the lower half-shell of the mould according to the mould model, a step of producing the prosthesis successively comprising at least: a sub-step of providing at least one artificial tooth, a sub-step of positioning the artificial tooth in an accommodation of the lower half-shell, a sub-step of assembling the mould and a sub-step of casting a filling material in the mould.

By "shell" is meant according to the invention an assembly composed of two parts, or half-shells, which serve to make the mould. According to the invention, at least one of the two half-shells is formed by additive manufacture. The qualifiers "lower" and "upper" are arbitrary here, so as to easily identify each half-shell.

By "additive manufacture" is meant according to the invention a method of manufacture by adding matter, most often assisted by computer. It is defined by the ASTM standards body as being a process of giving form to a part by addition of matter, by stacking successive layers, as opposed to processes operating by removing material, such as machining. This is also the name given to the technology of three-dimensional printing (3D printing).

The method for manufacture of a removable dental prosthesis according to the invention, comprising the production of a mould at least partly by additive manufacture, is advantageously easy and fast. Furthermore, the precision of the additive manufacture techniques, which is much more accurate than by the usual methods, enables the prosthesis to be made fully suited to the environment in which it is to be inserted.

The upper half-shell is produced either, preferably, by additive manufacture, or by another method such as moulding in plaster. In the latter case, the half-shell may be solid.

According to one embodiment, the step of producing the mould is such that the digital modelling sub-step produces a model of the partial mould, i.e. solely concerning the lower half-shell, according to the prosthesis model, and the additive manufacture sub-step achieves the manufacture of that partial mould according to the mould model. However, this embodiment is not preferred.

According to one embodiment that is preferred, the step of producing the mould is such that the digital modelling sub-step produces a model of the complete mould according to the prosthesis model, and the additive manufacture sub-step achieves the manufacture of the whole mould according to the mould model. This corresponds to the case in which the upper half-shell is also produced by additive manufacture. However, it is also possible for the lower half-shell to be produced by additive manufacture and for the upper half-shell to be produced by a more conventional technique, for example by means of a plaster mould.

The positioning member is generally produced by the complementarity of the imprint of the tooth part of the prosthesis to produce and of the imprint of the gum part of the prosthesis to produce, so as to produce an assembly by juxtaposition, but also and preferably it serves to hold the two half-shells, at least transversely, relative to each other. Furthermore, still more preferably, the positioning member serves to provide sealing between the two half-shells of the mould, so as to facilitate the casting by the filling material and simplify possible finishing work.

The positioning of an artificial tooth or teeth in the accommodation of the lower half-shell carried out by additive manufacture does not require the artificial tooth to be entirely included "in" the accommodation. What is important is that the tooth be positioned/inserted at least partly in that accommodation since the latter is a mounting for that tooth. Most often, the artificial tooth is inserted until it stops, that is to say that its occlusal faces are in engagement (translational stopping). Thus, the artificial tooth can protrude so as to be located also partly into the imprint of the other half-shell once the mould is assembled.

The removable dental prosthesis obtained according to the method of the invention is a complete prosthesis or a partial prosthesis.

The removable dental prosthesis obtained according to the method of the invention can comprise a bar (or structure) for support, for example of metal (stellite).

Such a stellite may be a base and/or a set of hooks It is especially useful in the case of a partial prosthesis, typically to hold together two separate parts of the prosthesis. Advantageously, it is fastened into the partial prosthesis after the casting and will thus be joined to the dental prosthesis.

The support bar may be inserted at least partly into the prosthesis on moulding, or be fastened to the prosthesis once the latter has been produced and removed from the mould. In the first case, it is fastened into the prosthesis, generally by being "sandwiched" between the two half-shells of the mould, after casting, and forms part of the prosthesis, so facilitating the fastening thereof onto the jaw, especially if the jaw comprises at least two implants external to the prosthesis. This is especially the case when the dental prosthesis is complete. In the second case, different support means, such as indentations, and/or fastening spaces, are arranged in the prosthesis, generally in the less technical zones, so as to be able to fasten the support bar. These arrangements are preferably provided at the time of the at least partial computer assisted design (i.e. modelling) of the mould, and are to be found in the mould at the time of its additive manufacture. They are then present in the prosthesis on its actual completion. They may also be produced on the prosthesis once it has been removed from the mould. Such arrangements may also enable the prosthesis to be fastened to at least one implant via a retaining bar if required.

The support bar is preferably incorporated within the mould before the casting step, by a sub-step of providing the support bar followed by a sub-step of positioning the support bar in one of the half-shells, it also being possible for the other half-shell to comprise reception means, such as indentations and/or spaces, to receive the support bar at least partly at the time of assembly. These two sub-steps are carried out before or after one of the sub-steps of artificial tooth providing and positioning. The person skilled in the art is capable of adapting the succession of the sub-steps preceding the assembly of the mould in the way most appropriate for producing the prosthesis.

According to another embodiment, the prosthesis is configured to be fastened in the mouth with use of at least one support bar, configured to enable the fastening of the prosthesis on at least two implants of the jaw.

According to one embodiment, the prosthesis is directly usable without the use of a support bar and may for example be held solely by bearing locations on the mucosa and/or palate.

According to a preferred embodiment, the sub-step of additive manufacture of the mould is carried out by at least one of the following techniques: stereolithography (or SLA, initialism for "stereolithograph apparatus"), DLP (initialism for "digital light projecting") or FDIVM (initialism for "fused deposition modelling"); PolyJet® process.

Preferably, the sub-step of additive manufacture of the mould is carried out by photopolymerisation, typically by the PolyJet® process or by stereolithography (SLA). Still more preferably, the sub-step of additive manufacture of the mould is carried out by a method comprising a succession of additions of material by jet on a printing substrate, layer-wise, the polymer being solidified by photopolymerisation after each jet: this is the PolyJet® process.

Stereolithography (SLA) is a technique of additive manufacture using, for manufacturing objects, the principle of photopolymerisation of acrylate monomers or monomers of epoxide or acrylonitrile butadiene styrene (ABS), with high accuracy. This technique is briefly reviewed here. A three-dimensional digital file, or model, in STL format is generally sent to an SLA additive manufacture printer (or 3D printer) in which a software application cuts the model into several print layers of a thickness that is in general fixed. An object is then printed starting from a horizontal platform immersed in a bath of liquid monomer. To that end, photopolymerisation of the monomer is induced by a ray of ultraviolet laser light, controlled using deflectors formed by high precision mirrors. The laser beam sweeps the surface of the liquid monomer according to the digital three-dimensional model sent to the printer. Once a layer of material has solidified, that is to say sweeping of the layer has been carried out, the platform descends by the value of the thickness of the next layer, and a new section is solidified. This operation is repeated as often as necessary to obtain the entire volume of the object. Post-treatment in an oven may be required to finish the polymerization, and increase the strength of the material to the maximum. Before or after this post-treatment, the object obtained is most often cleaned using a solvent.

Digital light processing (or DLP) is a technique using the same technology as that of video projectors. The principle is similar to SLA, but here, it is light which enables a liquid monomer to be solidified (and not a laser). UV light (ultraviolet) generated by a suitable apparatus is reflected by an array composed of a multitude of orientable mirrors and projects a corresponding image having the form of the printed layer. The light strikes the monomer which is situated in a bath to solidify it. The processing is carried out layer by layer, as for SLA.

Fused deposition modelling (FDM®, of the company Stratasys) is a process which enables a wide variety of material colours to be used. The principle is that the material, most often present in the form of reels, passes through an extrusion nozzle heated between 170 and 260° C. This material melts and deposits on a substrate, called print platform, by layers of which the fineness varies according to the nature of the material and the settings. It is typically 0.02 mm. Once a first layer has terminated, the print platform descends to receive a second layer and so forth. The print platform can also, according to a variant, be heated to mitigate the deformation of the thermal shock undergone by the plastic because the latter passes from more than 200° C. to ambient temperature practically instantaneously. According to a variant, at least of it of extrusion are present, which makes it possible to print an object in at least two different colours or at least two different materials.

As indicated above, the PolyJet® process (of the company Objet) is a photopolymerisation process, in the same way as SLA. The principle is that jets of material are projected on a printing substrate, in layers defined by the printing software. After each jet, the polymer is solidified using a UV ray.

According to a preferred embodiment, the additive manufacture material is chosen from the group formed by acrylic monomers, epoxide monomers, and acrylonitrile butadiene styrene (ABS). Still more preferably, the additive manufacture material is an acrylic monomer such as methyl methacrylate. This is mainly the case when using the PolyJet®, SLA and DLP processes.

According to another preferred embodiment, the additive manufacture material is chosen from the group formed by polylactic acid polymers (PLA), polyvinyl alcohol (PVA), acrylonitrile butadiene styrene (ABS) and ethylene terephthalate (PET). This is mainly the case when using fused deposition modelling.

According to a preferred embodiment, the step of actual production of the prosthesis is preceded by a step of taking an imprint. The step of taking an imprint is well-known to the person skilled in the art. The step of taking an imprint is thus carried out, either on a plaster model by virtue of a table scanner, or, preferably, directly using an intraoral scanner.

The material used to produce the prosthesis, in particular part of the prosthesis representing the gum, is usually an acrylic monomer such as methyl methacrylate.

However it may also be any monomer, also called "resin" or possibly "dental resin" in everyday language of prosthetists, known to the person skilled in the art to enable a prosthesis to be made. The term self-curing resin is often used in this case. Polymerization is carried out commonly and as is known to the person skilled in the art. For example, polymerization is carried out in the air, after possible addition of a catalyst or hardener, at ambient temperature of approximately 23° C., for a time of several minutes or possibly tens of minutes. Typically this time (or setting time) is from 6 to 9 minutes.

Polymerization may also be carried out in controlled manner by means of a pressure polymerization chamber, for example of Palamato elite type (from the company Heraeus Kruzer) for several minutes, for example 10 minutes. This chamber forms a water-bath, possibly under pressure, with typically a water temperature of 55° C. and a pressure of 2 bar. The use of this apparatus is particularly advantageous for avoiding the presence of bubbles in the prosthesis.

According to a preferred embodiment, the step of actual production of the prosthesis is followed by at least one step of removal from the mould and/or finishing.

"A and/or B" here means "A, or else B, or else A and B".

"Removal from the mould" here means obtaining the prosthesis from the mould. Removal from the mould may be total or, most often, partial. This is because undercuts may often still be present, in which case the shell or shells obtained by additive manufacture are broken to obtain the prosthesis.

All the usual finishing steps of the technology that are well-known to the prosthetist such as smoothing with abrasive, polishing, buffing and glazing may be envisioned, in particular in order for the surface state of the prosthesis to have no irritant contact once inserted into its environment.

According to a second aspect, the invention concerns a removable dental prosthesis obtained by a manufacturing process according to the invention.

The prosthesis may be a complete prosthesis or a partial prosthesis.

According to one embodiment, the prosthesis comprises a support bar, for example of metal (stellite), typically of cobalt chrome, as is known in the art. However, such a support bar may also be produced by additive manufacture, or by lost-wax casting.

As indicated above, the prosthesis may comprise fastening spaces configured to enable its fastening on at least one implant, possibly via a retaining bar.

BRIEF DESCRIPTION OF THE DRAWINGS

The removable dental prosthesis manufacturing method according to the invention will be better understood in the light of the following detailed description, given by way of non-limiting indication, with reference to the accompanying drawings illustrating three embodiments: a first embodiment illustrated in FIGS. 1 to 11, a second embodiment illustrated in FIGS. 12 to 16, and a third embodiment illustrated in FIGS. 17 to 28. FIGS. 1 to 28 take the following form:

FIRST EMBODIMENT OF THE INVENTION

Figure 1:
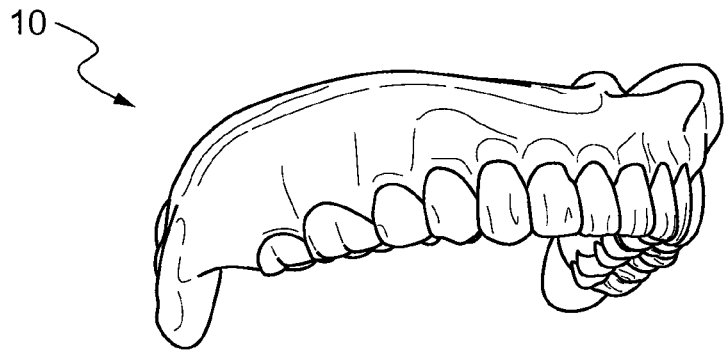
Figure 2:
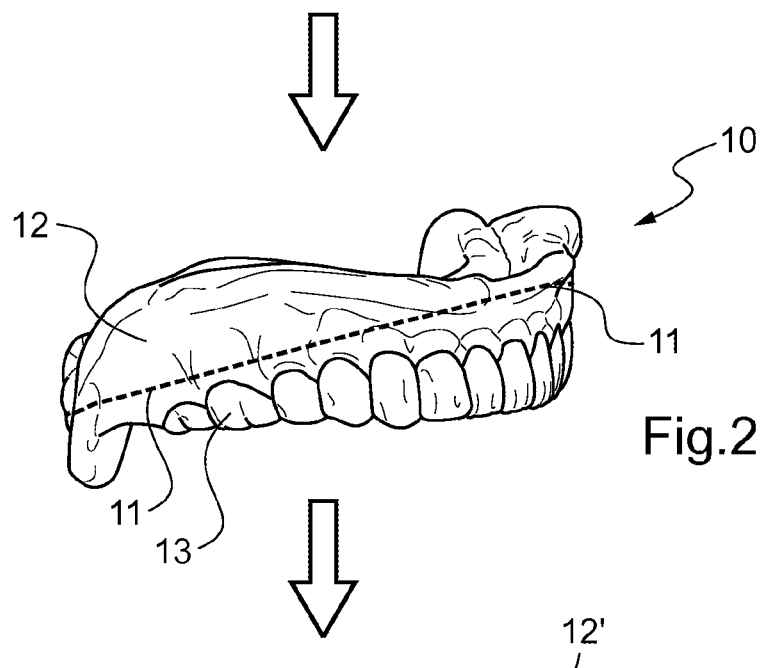
Figure 3:
Figure 7:
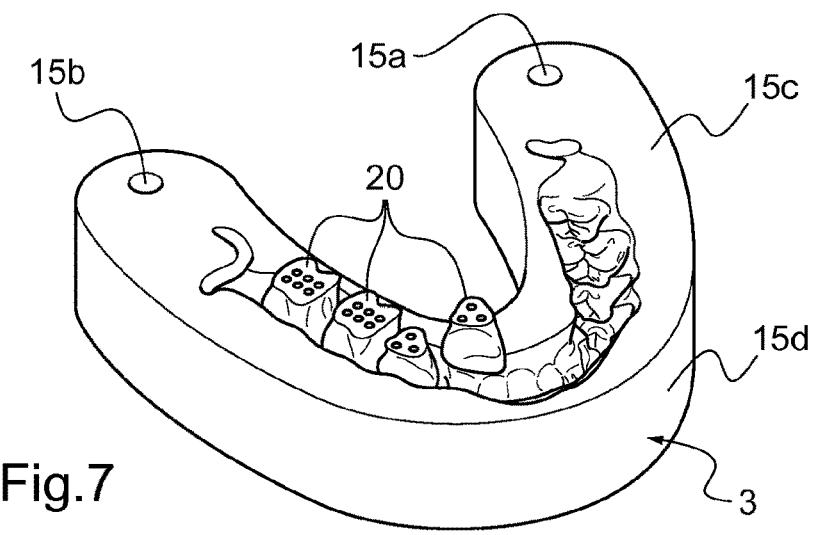
Figure 8:
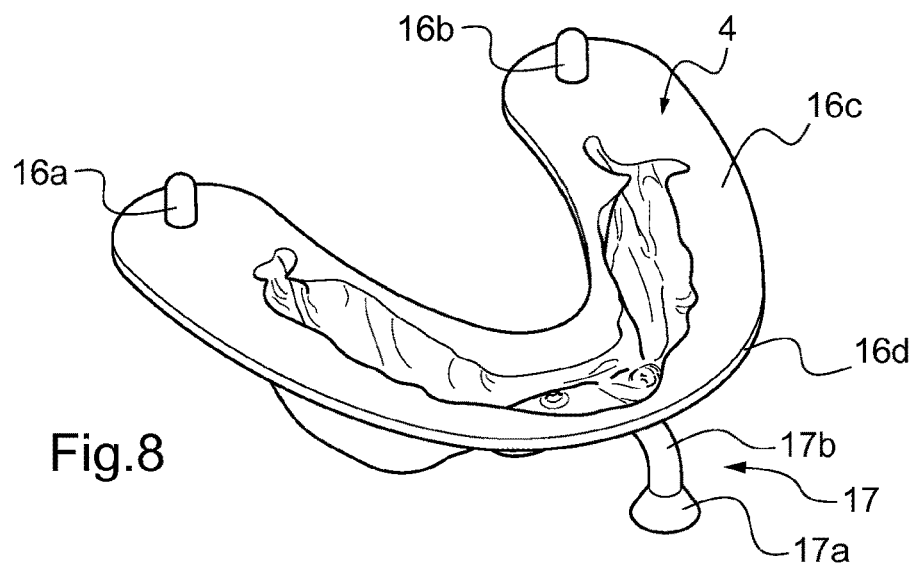
Figure 9:
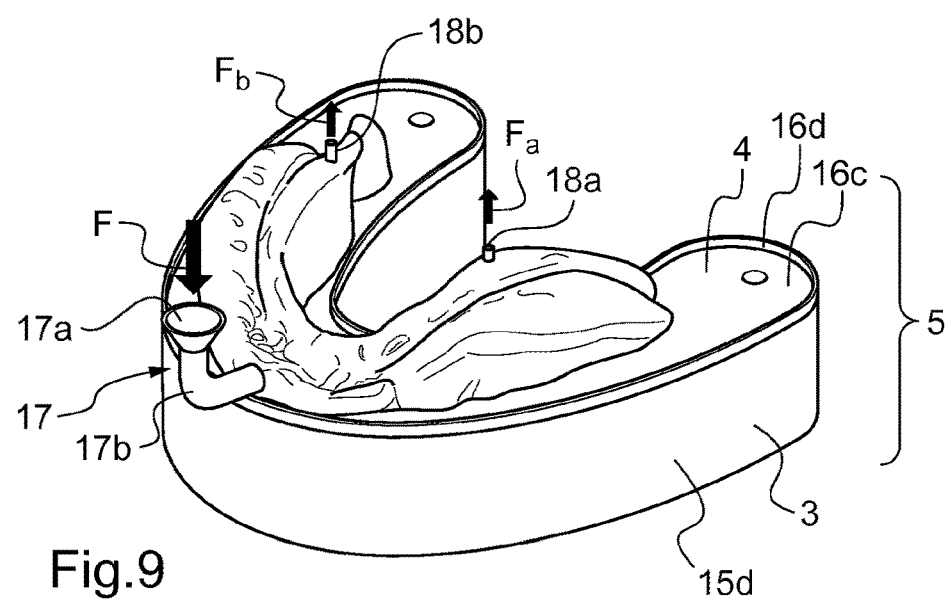
Figure 10:
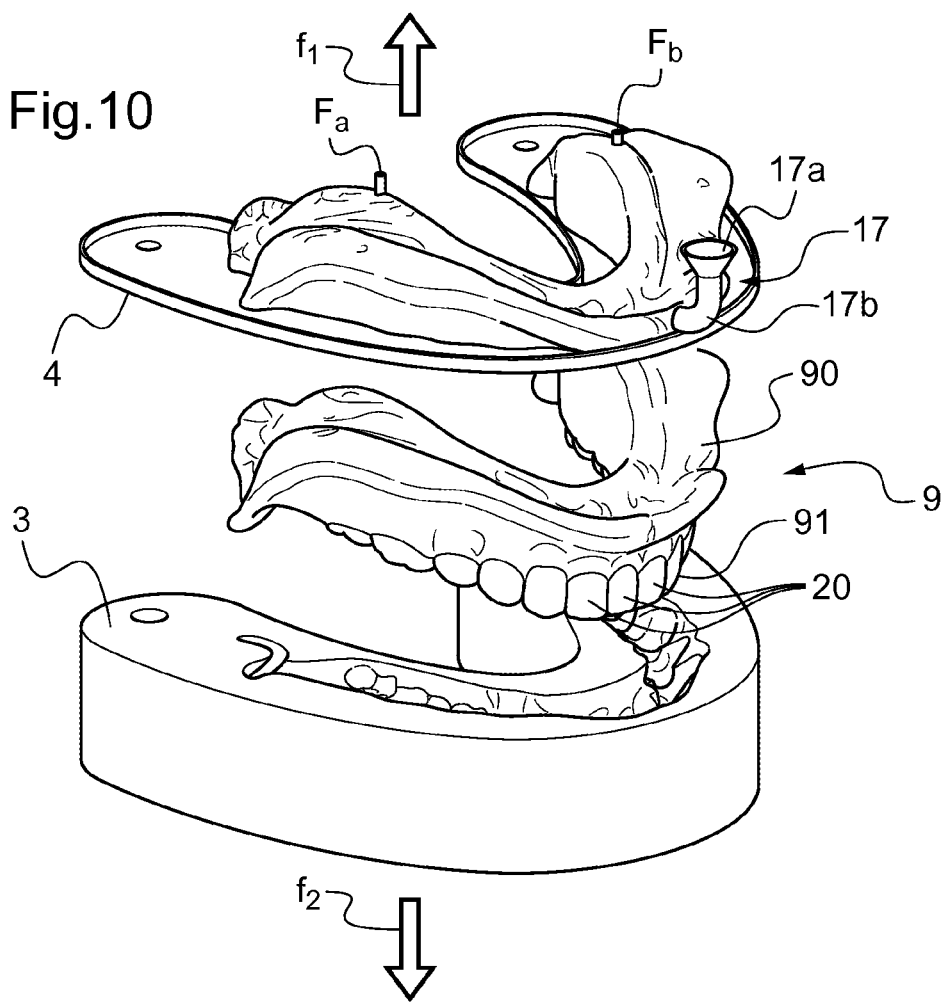
Figure 11:
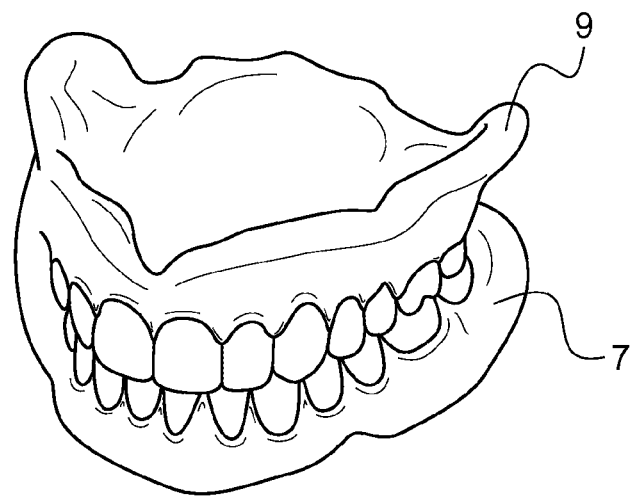

FIG. 1 is a diagrammatic representation of a perspective view of a dental prosthesis model, according to a first embodiment of the invention;

FIG. 2 is a diagrammatic representation of a perspective view of the model of FIG. 1 in which an artificial delimitation enables a separation into two parts (tooth part and gum part);

FIG. 3 is a diagrammatic representation of a perspective view of the model of FIGS. 1 and 2 after the separation into two parts of the item of FIG. 2;

FIG. 4 is a diagrammatic representation of the production of a model of a lower half-shell of the mould from the first of the two parts of FIG. 3, in perspective view from above (FIG. 4A) and from below (FIG. 4B);

FIG. 5 is a diagrammatic representation of the production of a model of an upper half-shell of the mould from the second of the two parts of FIG. 3, in perspective view from above (FIG. 5A) and from below (FIG. 5B);

FIG. 6 is a diagrammatic representation of a perspective view of the mould model produced by assembly of the two half-shell models by juxtaposition against each other, producing the imprint of the model;

FIG. 7 is a diagrammatic representation of a perspective view of a half-shell corresponding to the tooth part produced by additive manufacture from the first half-shell model of FIG. 4, and also represents the sub-step of providing at least one tooth 20 as well as a sub-step of positioning at least part of that tooth 20;

FIG. 8 diagrammatically represents a perspective view of the half-shell corresponding to the gum part produced by additive manufacture on the basis of the second half-shell model of FIG. 5;

FIG. 9 is a diagrammatic view in perspective of the mould constituted by the half-shells of FIGS. 7 and 8, and also represents the sub-step of casting from the step of actual production of the dental prosthesis;

FIG. 10 is a diagrammatic representation of a perspective view of the step of removal from the mould of the dental prosthesis produced by the method for manufacture in the casting sub-step illustrated by FIG. 9; and FIG. 11 is a diagrammatic representation of a perspective view of two complete dental prostheses, an upper jaw prosthesis obtained further to the step of FIG. 10, and a lower jaw prosthesis obtained similarly.

SECOND EMBODIMENT OF THE INVENTION

FIG. 12 is a diagrammatic representation of an exploded perspective view of three parts forming a dental prosthesis mould obtained after modelling, according to a second embodiment of the invention;

FIG. 13 is a diagrammatic representation in detail of one of the three parts (tooth part) of the dental prosthesis mould of FIG. 12;

FIG. 14 is a diagrammatic representation of a perspective view of the dental prosthesis mould of FIGS. 12 and 13 after the fastening of one part of the three parts on another of the three parts;

FIG. 15 is a diagrammatic representation of a perspective view of the mould after assembly;

FIG. 16 is a diagrammatic representation of another perspective view, complementary to FIG. 15, of the mould after assembly,

THIRD EMBODIMENT OF THE INVENTION

Figure 17:
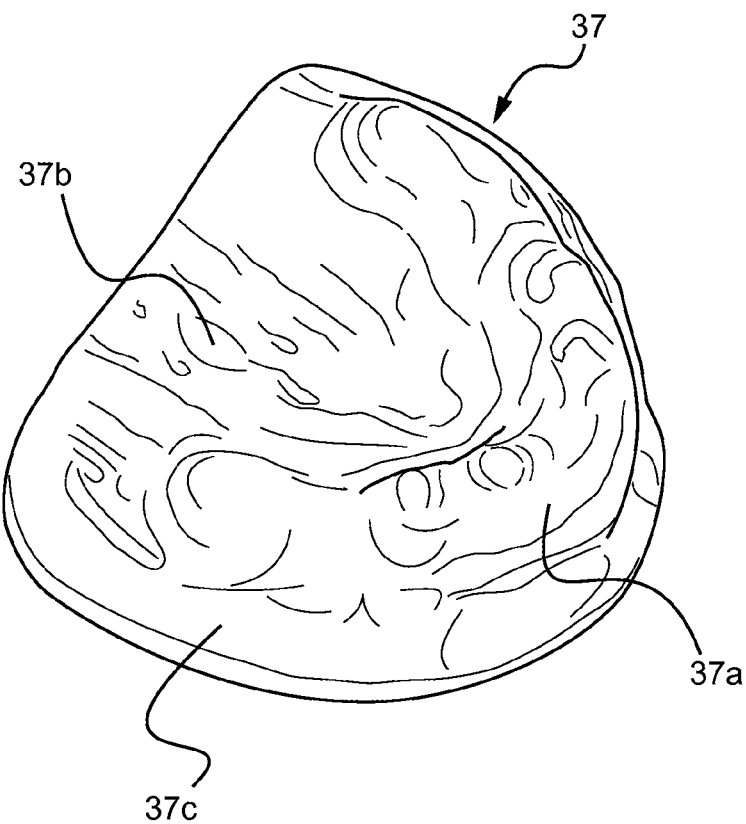
Figure 18:
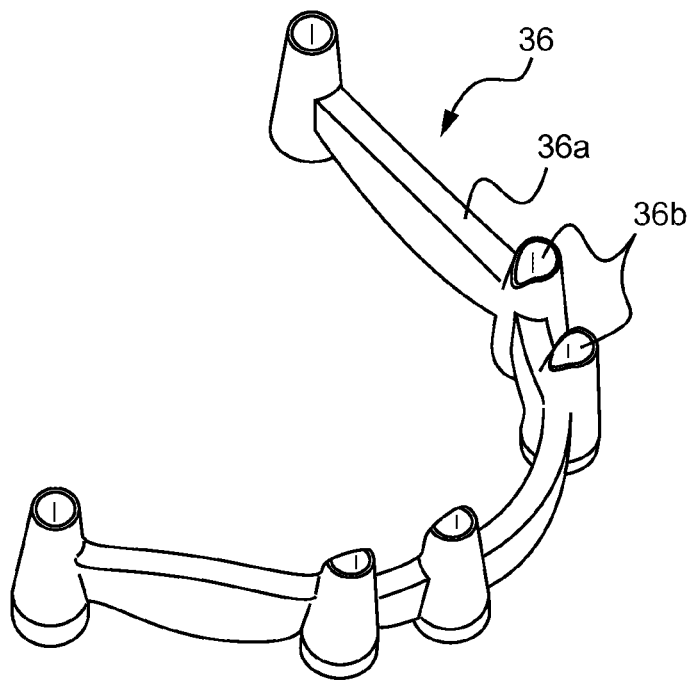
Figure 19:
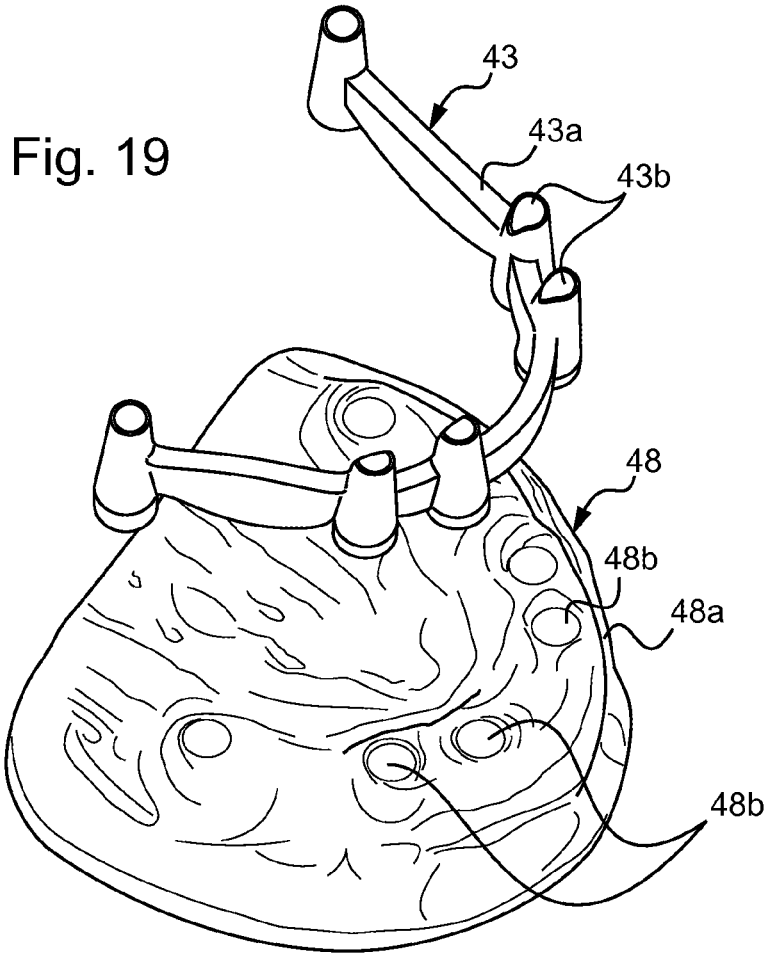
Figure 20:
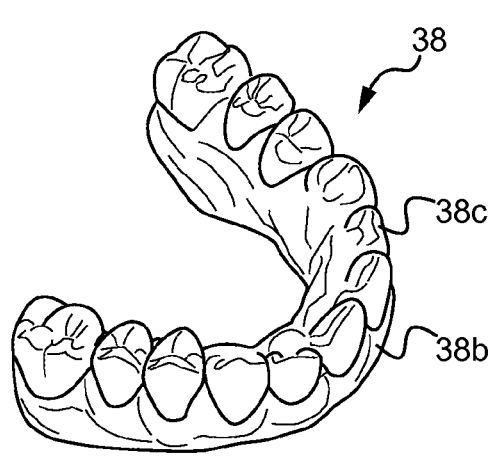
Figure 21:
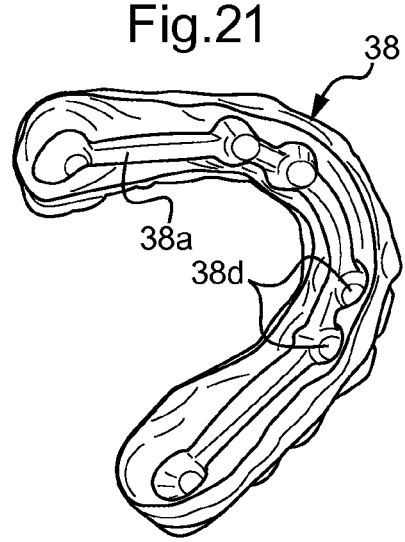
Figure 22A:
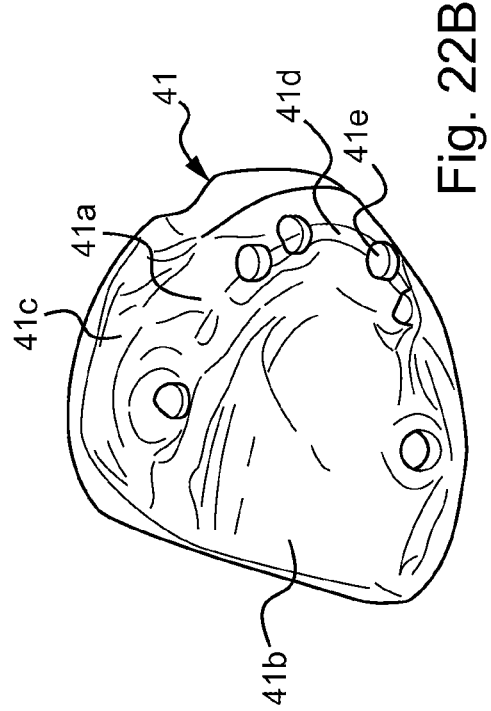
Figure 22B:
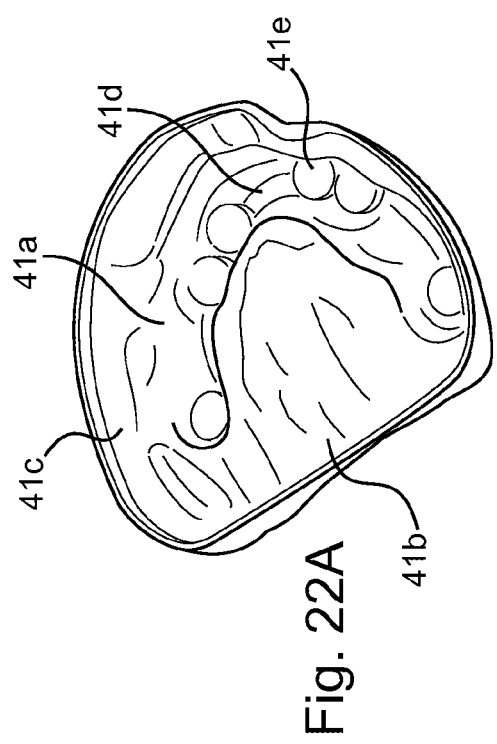
Figure 23A:
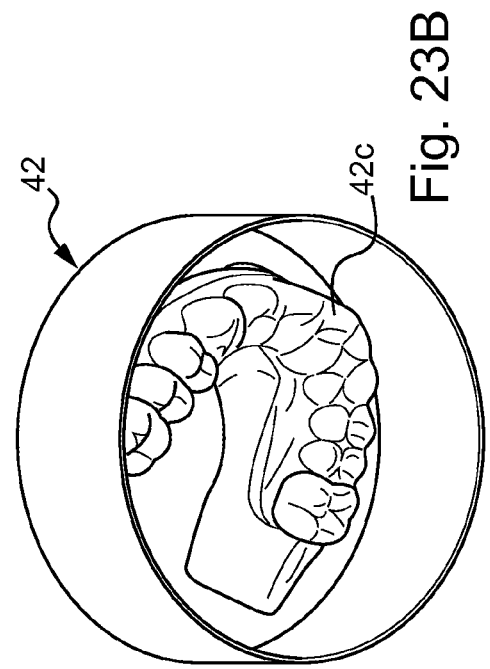
Figure 23B:
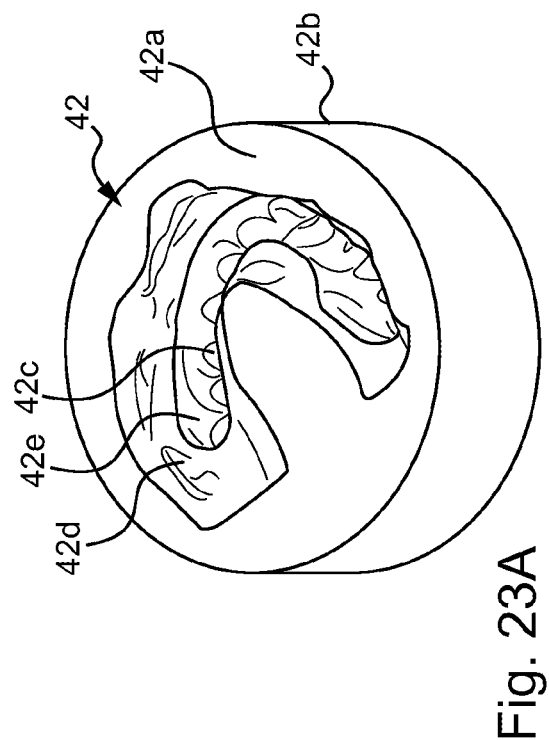
Figure 24:
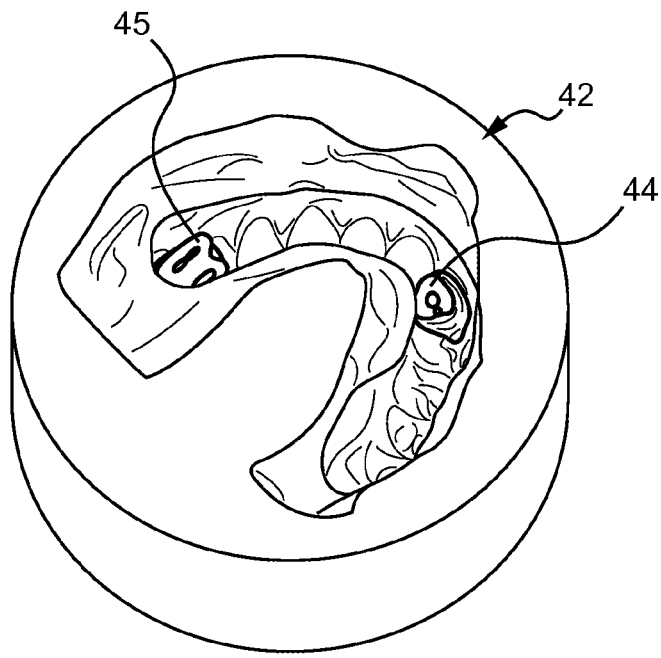

FIG. 17 is a diagrammatic representation of a perspective view of a first part (gum part) of a dental prosthesis mould model, according to a third embodiment of the invention;

FIG. 18 is a diagrammatic representation of a perspective view of a second part (support bar) of the dental prosthesis mould model of FIG. 17;

FIG. 19 is a diagrammatic representation of a perspective view of the first part and of the second part of the dental prosthesis mould model, the second part (support bar) being re-worked;

FIG. 20 is a diagrammatic representation of a perspective view from above of a third part (tooth part) of the dental prosthesis mould model of FIGS. 17 to 19;

FIG. 21 is a diagrammatic representation of a perspective view from below of the third part from FIG. 20, reworked;

FIG. 22 is a diagrammatic representation of a perspective view from above (FIG. 22A) and from below (FIG. 22B) of a lower half-shell corresponding to the gum part produced by additive manufacture from the half-shell model of FIGS. 17 and 20;

FIG. 23 is a diagrammatic representation of a perspective view from above (FIG. 23A) and from below (FIG. 23B) of an upper half-shell corresponding to the tooth part produced by additive manufacture from the half-shell model of FIGS. 18 and 20;

FIG. 24 is a diagrammatic representation of a perspective view from above of the half-shell of FIG. 23 at the time of the sub-step of providing an artificial tooth 45 as well as at the time of the sub-step of positioning another artificial tooth 44.

Figure 25:
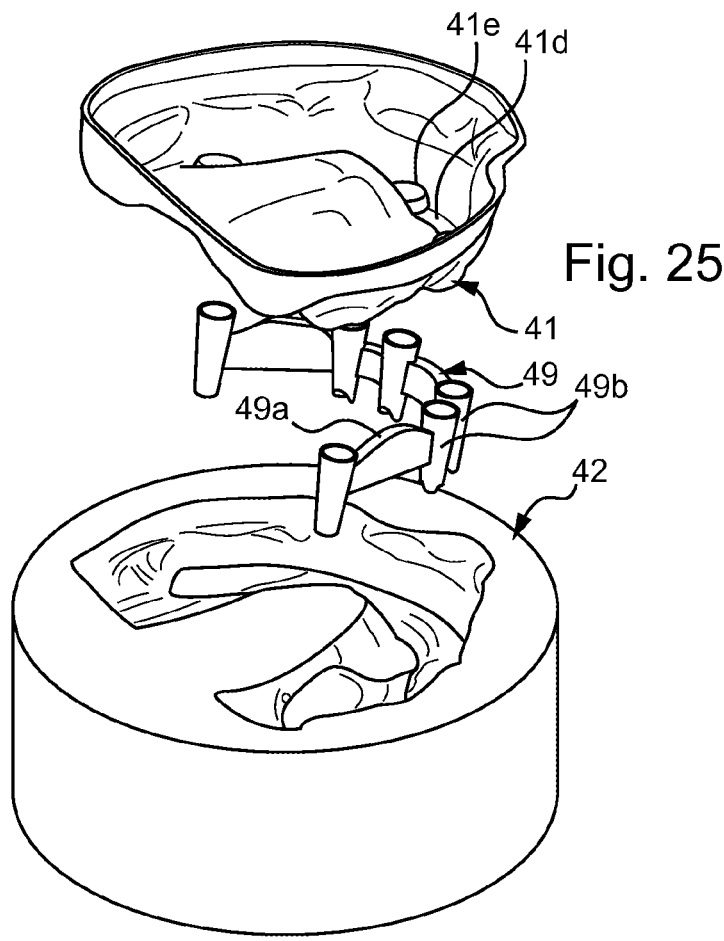
Figure 28:
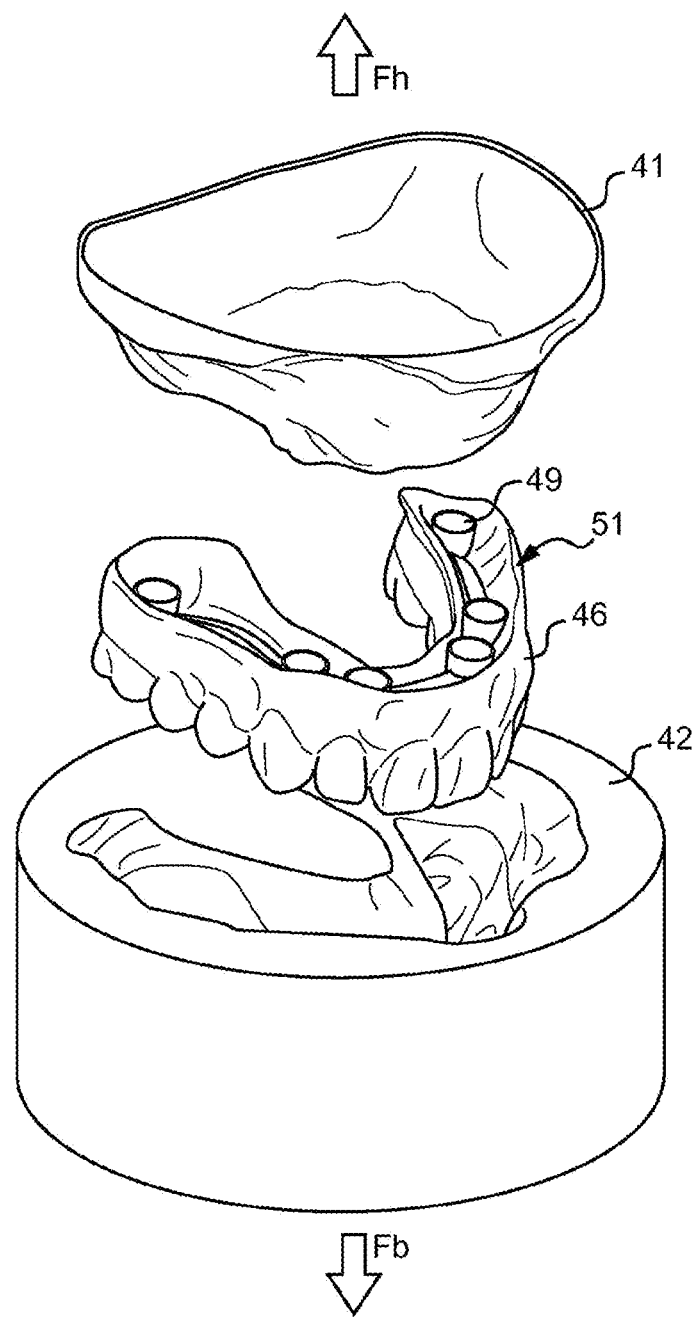

FIG. 25 is a diagrammatic representation of an exploded perspective view of the assembly of the mould formed from the half-shells of FIGS. 22 and 23 and of a support bar corresponding to the part of FIGS. 19 and 20;

FIG. 26 is a diagrammatic representation of a cross-section view of the mould after assembly;

FIG. 27 is a diagrammatic representation of a perspective view of the mould after assembly and before casting the resin;

FIG. 28 is a diagrammatic representation of a perspective view of the removal from the mould of a prosthesis so obtained after casting the resin.

In the Figures, identical parts are identified by identical numerical references.

DETAILED DESCRIPTION OF THE PREFERRED EMBODIMENTS

The first embodiment discloses all the steps of the method according to the invention, with the exception of the step of taking an imprint. The second embodiment is described only as regards the modelling, the manufacture and the assembly of the mould, the steps of casting filling material in the mould for actual manufacture of the dental prosthesis, then removal from the mould of the dental prosthesis so obtained, being transposable from the first embodiment. The third embodiment discloses all the steps of the method according to the invention, with the exception of the step of taking an imprint.

FIRST EMBODIMENT OF THE INVENTION

FIGS. 1 to 10 according to the first embodiment of the invention illustrate the case of a method for manufacture of a complete dental prosthesis, here for an upper jaw. FIGS. 1 to 6 represent phases of computer aided design, which generates models, while FIGS. 7 to 10 represent phases of actual manufacture itself, comprising the actual production by additive manufacture of the mould then the actual production of the dental prosthesis using the mould. FIG. 11 illustrates the case of two complete dental prostheses, of the upper jaw and lower jaw, obtained by the method of the invention, the lower jaw dental prosthesis having been produced in the same way as the dental prosthesis manufactured in the steps illustrated by FIGS. 1 to 10.

As FIG. 1 illustrates, a digital file representing a model 10 of a three-dimensional removable dental prosthesis was produced in STL format using a computer-aided design (CAD) software application, such as an application such as SolidWorks®, Sculpt® or Maya®. The three-dimensional imprint of the model 10 of FIG. 1 will next be processed by a general software application, such as Magics®, or by a specific software application, for example such as 3Shapes®, Exocad® or Dental Wings®, to reconstitute dentition therein as well as the gum profiles.

This step of producing the three-dimensional dental prosthesis model was preceded by a step of taking an imprint (not illustrated) carried out either on a plaster model by virtue of a table scanner, or, preferably, directly by virtue of an intraoral scanner.

The following phases, illustrated by FIGS. 2 to 6, illustrate the sub-step of three-dimensional modelling of the mould.

FIG. 2 represents the model 10 of FIG. 1, in which a delimitation 11 has been made, thereby separating the model into two parts, an upper part 12 referred to as gum part and a lower part 13 referred to as tooth part.

Any form of delimitation may be envisioned, provided the greater part, or possibly the entirety of the teeth, is present in the lower part. According to a preferred embodiment, the delimitation is carried out substantially in a plane (called parting plane) which facilitates manipulation while making it possible, subsequently, to produce two half-shells that can easily be joined to each other in that plane.

FIG. 3 represents the model 10 of FIG. 1, after separation of the upper part; or gum part, 12, and of the lower part, or tooth part 13, according to the delimitation 11. A model 10' is thus obtained as represented, separated into two parts which are a gum part 12' and a tooth part 13'.

FIG. 4 is a diagrammatic representation of production of a model of a first mould half-shell 130 corresponding to the tooth part 13' of the model 10'. This first half-shell model 130 was produced as a negative of the part 13' of FIG. 3, which thus comprises an accommodation for the teeth, in perspective view from above (FIG. 4A) and from below (FIG. 4B). The outside surface of the tooth part 13' of the model 10' of FIG. 3 corresponds in every respect to the inside surface of the half-shell 130. The periphery of this inside surface is completed by a U-shaped planar wall 150c. The first half-shell model, or offset, 130 is hollow and comprised within a U-shaped three-dimensional virtual volume, delimited by the wall 150c, in this adopting substantially the shape of an upper jaw.

The thickness of this model, or skin, is approximately 0.5 mm. Advantageously, this thickness is produced through homothecy by excess thickness relative to the outside surface of the model 10' of FIG. 3. This thickness is uniform by virtue of the use of additive manufacture, which makes it possible to save material. The additive manufacture is particularly advantageous from this point of view.

The depth $P_5$ of the U is here of greater or equal magnitude to the height of the teeth. It extends between two substantially parallel planes, one of which corresponds to the delimitation 11 and is materialized by the planar wall 150c, the other plane (virtual) being substantially parallel to the plane 150c. A lateral wall 150d links these two planes over the periphery of the U. The first half-shell 130 comprises two centring holes 150a and 150b which are located in the rear part, that is to say on the two ends of the U. The centring holes 150a and 150b extend recessed from the wall 150c towards the inside of the first half-shell model 130. Preferably, they are of length less than or equal to the depth of the U, $P_5$.

FIG. 5 is a diagrammatic representation of production of a model of a second mould half-shell 140 corresponding to the gum part 12' of the model 10'. This second half-shell model 140 was produced as a negative of the part 12' of FIG. 3, which thus constitutes an imprint of the gum part, in perspective view from above (FIG. 5A) and from below (FIG. 5B). The outside surface of the gum part 12' of the model 10' of FIG. 3 corresponds in every respect to the inside surface of the half-shell 140. The periphery of this lower surface is completed by a U-shaped planar wall 160c, configured to cooperate with the planar wall 150c of the half-shell 130. At the periphery of the planar wall 160c there is a slight rim 160d in the form of a rib, configured to stiffen the half-shell 140. The second half-shell model 140, or offset, is hollow and is included within a U-shaped three-dimensional virtual volume, delimited by plane 160.

The depth $P_6$ of the U is here of greater or equal magnitude to the height of the gum. It extends between two substantially parallel planes. One of these planes corresponds to the plane of the delimitation 11 and is materialized by the wall 160c, the other plane (virtual) being substantially parallel to that first plane 160c. The second half-shell 140 comprises two centring pins 160a and 160b which are located in the rear part, that is to say on the two ends of the U. The pins 160a and 160b extend projecting from the wall 160c towards the outside of the second half-shell model 140 and are of length substantially identical to that of the respective centring holes 150a and 150b, with which they are respectively configured to cooperate.

FIG. 6 is a diagrammatic representation of a perspective view of the mould model 8 produced by assembly of the two first and second half-shells models 130 and 140 by juxtaposition against each other by virtue of the (virtual) insertion of the centring pins 160a and 160b into the respective holes 150a and 150b. The mould model 8 thus form the imprint (or the negative) of the offset 10'. The mould so virtually formed defines the shape of the upper jaw to produce as a complete dental prosthesis. The production of this mould model 8 marks the end of the CAD phase of the method.

The vents and casting hole(s) are not shown in FIGS. 4 to 6 in the interest of simplification but are preferably also modelled.

FIG. 7 is a diagrammatic representation of a perspective view of a first half-shell 3 corresponding to the tooth part produced by additive manufacture, for example by SLA, from the first half-shell model 130 of FIG. 4.

FIG. 8 is a diagrammatic representation of a perspective view of a second half-shell 4 corresponding to the tooth part produced by additive manufacture, for example by SLA, from the second half-shell model 140 of FIG. 5.

FIG. 9 is a diagrammatic view in perspective of the mould 5 constituted by the assembly of the first half-shell 3 of FIG. 7 and the second half-shell 4 of FIG. 8, producing the imprint of the model 10'.

The half-shell 3 comprises centring holes 15a and 15b, a U-shaped planar wall 15c from which project the U-shaped lateral wall 15d. In this it reproduces the aspects of the virtual half-shell 130 and of its parts 150a, 150b, 150c and 150d. The half-shell 4 comprises two centring pins 16a and 16b, a planar wall 16c and a rim 16d. In this it reproduces the aspects of the virtual half-shell 140 and of its parts 160a, 160b, 160c and 160d.

The positioning member of this first embodiment is thus formed by at least two pins (16a, 16b) present on a planar part of the wall or on a planar wall 16c, preferably on a planar wall 16c, of one of the two half-shells 4 configured to cooperate respectively with at least two centring holes (15a, 15b) present on a planar wall part or on a planar wall 15c, preferably on a planar wall 15c, of the other of the half-shells 3. In the case represented here, the two walls (15c, 16c) are (entirely) planar and are configured to be juxtaposed against each other over their whole surface.

In a preferred embodiment, represented here, the two walls 15c and 16c are U-shaped. However, they may also have another geometrical shape, provided those shapes cooperate with each other to provide positioning engagement. In a preferred embodiment, independently or not independently of the preceding embodiment, the outside periphery of the wall 16c and the inside periphery of the wall 15d substantially coincide at the time of their positioning engagement.

The vents are not represented in FIGS. 7 and 8 in the interest of simplification. However, they are represented in FIG. 9.

In FIG. 7 artificial teeth 20 are moreover represented, illustrating at the same time a sub-step of providing teeth 20 as well as a sub-step of positioning those teeth 20 in an accommodation corresponding to the first half-shell 3.

The first half-shell 3 comprises holes 15a and 15b respectively for centring pins 16a and 16b of the second half-shell 4.

In FIG. 8, it can be seen that the second half-shell 4 comprises a supply channel 17, also designated "runner" configured to enable the flow of a filling material (which is in liquid form or in powder form) into the imprint formed by the two assembled half-shells 3, 4. The supply channel 17 is represented here as central (relative to the U-shape of the model), preferably emerging onto a part of the imprint that is as untechnical as possible. It comprises a supply hollow 17a and a flow channel 17b opening both into the imprint of the half-shell 4 and into the supply hollow 17a. The filling material is introduced by the supply hollow 17a on casting.

However, any other location of the supply channel 17 may be envisaged in the context of the invention, according to a variant not shown.

In FIG. 9, the half-shells 3 and 4 have been juxtaposed against each other by assembly and insertion of the centring pins 16a and 16b in the centring holes 15a and 15b, the planar surfaces 15c and 16c being pressed against each other after positioning of the set of teeth 20 in the accommodations of the imprint of the first half-shell 3. The presence of two vents 18a and 18b can be seen, which are formed here vertically in the upper part of the second half-shell 4.

FIG. 9 illustrates a casting sub-step. Thus, a filling material is poured into the supply channel 17, as shown by arrow F. During this casting sub-step, the air present in the mould 5 is flushed via the two vents 18a and 18b, as shown by the respective arrows Fa and Fb.

Therefore, an upper jaw dental prosthesis 9 has been produced by moulding inside the mould 5.

FIG. 10 is a diagrammatic representation of a perspective view of the removal from the mould of the prosthesis 9. The dental prosthesis 9 comprises, by definition, a gum part 90 and a tooth part 91, itself comprising the teeth 20. The removal from the mould carried out here is total by application of two forces effecting two opposite withdrawal movements, illustrated by the arrows $f_1$ and $f_2$ The prosthesis 9, once extracted free from the mould, advantageously undergoes smoothing by abrasive (at the locations at which the supply channel and the vents emerged), and possibly any finishing step known in the art.

FIG. 11 is a diagrammatic representation of a perspective view of two complete dental prostheses 9 and 7, the upper jaw prosthesis 9 being obtained further to the step of FIG. 10, and the lower jaw prosthesis 7 being obtained similarly. These two complete dental prostheses 9 and 7 may be fastened to the jaw, temporarily, by adhesive suction, or by use of a fastening past or cream promoting that phenomenon of adhesive suction.

SECOND EMBODIMENT OF THE INVENTION

FIGS. 12 to 16 according to the second embodiment of the invention illustrate the case of a method for manufacture of a partial dental prosthesis, with stellite 22, here for an upper jaw. FIGS. 12 to 16 all represent the mould 29 once designed and manufactured by additive manufacture, before moulding (FIGS. 12 to 14) and after manufactured (FIGS. 15 and 16).

Thus, FIG. 12 is a diagrammatic representation of an exploded perspective view of the parts forming the dental prosthesis mould 29, which are an upper half-shell 21 (gum part), a lower half-shell 23 (tooth part) obtaining after modelling, as well as a stellite 22. The lower half-shell 23 is represented in FIG. 13 in a slightly different perspective view, which enables its form to be better perceived. The stellite 22 has been designed, as known to the person skilled in the art, based on the step of taking an imprint.

The step of taking an imprint was carried out by direct scanning in the mouth by intra-oral scanners, or by direct scanning on the imprint-taking made, for example, with alginate, the plaster model arising therefrom, or for instance by scanning. It is then possible to model the virtual model (in CAD) of the stellite, of the gum part and of the tooth part, for example using the Dental Wings® software.

The mould 29 is formed from these three parts 21, 22 and 23.

The lower half-shell 23 corresponds to the tooth part of the prosthesis to form and comprises the imprint of the tooth part to form (here two imprints 23a and 23c) supported by at least one support member 23b, here constituted by different support plates and different support abutments, said support member 23b preferably being borne, as is the case here, by a support plate 23d.

The stellite 22 is formed from a single piece of metal, which comprises two linking parts 22b and 22c, respectively corresponding to the members 23c and 23a of the tooth part, as well as a part 22a configured to be incorporated behind the teeth still present and a part 22d configured to bear on the palate. The stellite 22 is a piece of the mould, but also a piece of the partial dental prosthesis once this has been produced.

The upper half-shell 21 comprises the gum part of the dental prosthesis, and comprises the imprint of the gum part to produce, here in two parts 21a and 21c around the imprint of the teeth still present 21b, and an upper support part 21d. If necessary, the artificial teeth which will be incorporated into the final prosthesis are machined, in particular to enable better fastening, via for example an aperture enabling partial passage of the stellite. The stellite is of cobalt-chrome metal, as is known in the art.

The upper half-shell 21, which corresponds to the dental imprint of the patient's upper jaw, may be producing in a plaster mould, and in that case be solid. However, it is preferably produced by additive manufacture.

The lower half-shell 23 is manufactured by additive manufacture. The members 23c and 23a are configured to form the actual partial prosthesis, in combination with the corresponding gum part 21c and 21a of the upper half-shell 21, while incorporating the parts 22b and 22c of the stellite 22.

The positioning member thus comprises at least one support member 23b configured to support the imprint of the existing teeth 21b. Produced in this way, the positioning member basically consists of the complementarity of the imprint of the gum part (21a, 21c) and of the existing teeth 21b of the upper half-shell 21 and of the imprint of the tooth part (23a, 23c) and of the support member 23b of the lower half-shell 23. The positioning member is preferably, as is the case here, completed by the stellite 22 so as to provide sealing of the mould. This is particularly advantageous when casting the filling compound.

FIG. 14 is a diagrammatic representation of a perspective view of the dental prosthesis mould of FIGS. 12 and 13, after the fastening of the stellite 22 on the lower half-shell 23, at the locations provided for that purpose of the members 23*a*, 23*c*, and of the abutments 23*b*.

The abutments 23*b* comprise locations for receiving the stellite 22. They are members here represented as solid members, mainly to simplify the representation. However, it is preferred in the context of the invention to provide hollow abutments so as to save additive manufacture material, which is the filling material.

FIGS. 15 and 16 diagrammatically represent two complementary perspective views of the mould after assembly.

Therein it is possible to see the assembled mould 29, consisting of the upper half-shell 21, the stellite 22 and the lower half-shell 23. The supply of the filling material is made by runners (not shown) in the mould level with the members 23*a* and 23*c* of the lower half-shell, the mould 29 possibly further comprising at least one vent (not shown). This mould advantageously makes it possible to produce a prosthesis according to the invention, as was explained previously for the first embodiment.

THIRD EMBODIMENT OF THE INVENTION

FIGS. 17 to 28 according to the third embodiment of the invention illustrate the case of a method for manufacture of a complete dental prosthesis, here for the upper jaw, comprising a support bar 49 configured to fasten the prosthesis in the mouth by cooperation with six implants present in the jaw. FIGS. 17 to 23 represent phases of computer aided design, which generates models, while FIGS. 24 to 28 represent phases of actual manufacture itself, comprising the actual production by additive manufacture of the mould then the actual production of the dental prosthesis using the mould.

The support bar 49 is produced by additive manufacture. It could also have been produced by lost wax casting.

FIG. 17 is a diagrammatic representation of a perspective view of a first part 37 (gum part) of a dental prosthesis model, produced on the basis of the step of taking an imprint. The upper part 37 comprises a part corresponding to the gum 37*a*, a part corresponding to the palate 37*b*, as well as a peripheral part 37*c*.

FIG. 18 is a diagrammatic representation of a perspective view of a second part (support bar 36) of the dental prosthesis mould model of FIG. 17. The support bar 36 comprises a semi-circular main part 36*a*, and six different holding abutments 36*b*, the central part 36*a* bearing on these abutments 36*b*, configured to be placed in relation subsequently with the six implants of the patient. It is hollow and corresponds to the support bar 49 as it will be finally produced.

FIG. 19 is a diagrammatic representation of a perspective view of the first part and of the second part of the dental prosthesis mould model, reworked by CAD. Thus, the support bar 36 has been reworked as a support bar 43, which is a solid model (as opposed to the hollow model of FIG. 18), so as to be able to rework the part 37 (gum part) as part 48. The support bar 43 comprises a semi-circular main part 43*a*, and six different holding abutments 43*b*, the central part 43*a* bearing on these abutments 43*b*, configured to be placed in relation subsequently with the six implants of the patient. Part 48 comprises an actual gum part 48*a*, in which have been created six hollow parts or accommodation platforms 48*b* configured to enable the positioning of part 43, and corresponding to the cavities of the six abutments 43*b* at their bases configured to face part 48. Part 48 must be reworked further to comprise a hollow part corresponding to a support bar main part. This enables the later positioning of the support bar relative to the gum part, in the mould and then also in the prosthesis.

FIG. 20 is a diagrammatic representation of a perspective view from above of a third part 38 (tooth part) of the dental prosthesis mould model of FIGS. 17 to 19. Part 38 is solid. It comprises a tooth part 38*c* and a gum part 38*b*.

FIG. 21 is a diagrammatic representation of a perspective view from below of the third part 38 from FIG. 20, reworked. As explained earlier, the support bar 43 is a solid model (as opposed to the hollow model of FIG. 18), so as to be able to rework part 38 (tooth part). Part 38 comprises a hollow part 38*a* corresponding to an accommodation of the lower part of the main part 43*a* of the support bar 43, and six hollow parts 38*d* or accommodation platforms corresponding to the six abutments 43*b*. This enables the latter positioning of the support bar relative to the tooth part in the mould.

FIG. 22 is a diagrammatic representation of a perspective view from above (FIG. 22A) and from below (FIG. 22B) of a mould hollow upper half-shell 41 corresponding to the gum part 48, produced by additive manufacture from the model of the part of FIG. 19. The outside surface of the gum part 48 of FIG. 19 corresponds in every respect to the inside surface of the half-shell 41.

The thickness of the upper half-shell 41 is practically uniform and enables a particularly advantageous saving of material.

It is possible to distinguish an actual gum part 41*a*, a palate part 41*b*, a rim part 41*c*, a part 41*d* corresponding to an accommodation platform of the upper part of the main part 49*a* of the support bar 49, and a part 41*e* corresponding to an accommodation platform of the upper part of the abutments 49*b* of the support bar 49.

FIG. 23 is a diagrammatic representation of a perspective view from above (FIG. 23A) and from below (FIG. 23B) of a mould hollow lower half-shell 42 corresponding to the tooth part 38*c* produced by additive manufacture from the half-shell model of FIGS. 20 and 21. The outside surface of the tooth part 38*c* of FIG. 20 corresponds in every respect to the inside surface of the half-shell 42.

The thickness of the lower half-shell 42 is practically uniform and enables a particularly advantageous saving of material.

It is possible to distinguish a gum part 42*e*, a tooth part 42*c*, a rim part 42*d*, a substantially planar upper part 42*a* and a circular peripheral lateral part 42*b*. Parts 42*a* and 42*b* advantageously make it possible to rigidify the bottom part of the mould once this has been produced by additive manufacture.

FIG. 24 is a diagrammatic representation of a perspective view from above of the lower half-shell of FIG. 23 at the time of the sub-step of providing an artificial tooth 45 as well as at the time of the sub-step of positioning another artificial tooth 44. In this Figure, it can be seen that the artificial tooth 45 has already been positioned, while the artificial tooth 44 is in course of being positioned. The artificial teeth 44 and 45 each comprise passage apertures for screws which have been machined in them in advance. This apertures enable the fastening, before filling, of the abutments of the support bar 49 in the artificial teeth. This manner of proceeding is carried out as many times as necessary to provide all the six artificial teeth.

FIG. 25 is a diagrammatic representation of an exploded perspective view of the assembly of the mould formed from the upper 41 and lower 42 half-shells of FIGS. 22 and 23 and of a support bar (stellite) 49 corresponding to the modelled support bar (36, 43) of FIGS. 19 and 20; All the artificial teeth have been placed in advance in the lower half-shell 42. As explained above, the support bar 49 is fastened, level with each of the abutments 49b in the apertures of the artificial teeth 44, 45 . . . , then the upper half-shell 41 obturates the assembly. The support bar 49 will later be fastened by retention due to the resin inside the prosthesis 45.

The support bar 49 is configured to be interposed between the two half-shells (41, 42) on assembly, the support bar 49 comprising at least two holding abutments 49b and a semi-circular main part 49a bearing on these abutments, the support bar 49 being configured to be positioned on the lower half-shell 42 by at least one fastening means of at least one abutment 49b on at least one artificial tooth 44 housed in the tooth part of said lower half-shell 42, and the support bar 49 being configured to be positioned on the upper half-shell 41 by at least one accommodation platform of the upper part of the abutments.

Thus, the positioning member is formed by the complementarity of the imprint of the tooth part of the lower half-shell 42 and of the imprint of the gum part of the upper half-shell 41. Preferably, the positioning member consists of the complementarity of the imprint of the tooth part of the lower half-shell 42 and of the imprint of the gum part of the upper half-shell 41.

FIG. 26 is a diagrammatic representation a cross-section view of the mould after having juxtaposed the two half-shell 41 and 42 against each other by assembly. It is possible to distinguish the upper half-shell 41, the lower half-shell 42, the support bar 49 and an artificial tooth 44. It can be seen that the support bar 49 is screwed to the artificial tooth 44 level with one of its abutments.

FIG. 27 is a diagrammatic representation of a perspective view of the mould after assembly, and before casting the assembly material. It is possible to see therein the injection symbolized by a syringe partly filled with filling material, as well as a runner 41f for the supply of filling material. A single runner 41f has been symbolized. According to the invention, several runners may be present. The hole or holes 41f may have been machined in the lower half-shell 42 just prior to the assembly of the mould, as is symbolically represented here, or have been provided in the half-shell of the mould as of it being modelled. According to a preferred variant, the runner is complemented by at least one vent.

FIG. 28 is a diagrammatic representation of a perspective view of the removal from the mould of a prosthesis 51 so obtained after casting the filling material in the mould (41, 49, 42). The removal from the mould is carried out by application of two forces executing two opposite withdrawal movements, illustrated by the arrows Fh and Fb. The prosthesis 51 is composed of a resin 46 solidified around artificial teeth and the support bar 49. The abutments of the support bar will enable the positioning of the prosthesis 51 in the jaw of the patient via implants. These implants will thus be joined to the prosthesis 51.

The invention claimed is:

1. A method for manufacture of a removable dental partial prosthesis by moulding, said method comprising the following successive steps:
   a step of digitally modeling a prosthesis model, the prosthesis model representing the prosthesis to be produced and comprising a gum part and a tooth part;
   a step of producing a mould from the digitally modeled prosthesis model, said mould comprising upper and lower half-shells, the lower half-shell comprising a first imprint of the tooth part of the prosthesis, and the upper half-shell comprising a second imprint of the gum part of the prosthesis, the upper and lower half-shells being configured to be assembled by juxtaposition against each other, imprints of each half-shell forming by assembly an imprint of the prosthesis, the mould also comprising a positioning member for positioning one of the upper and lower half-shells relative to the other one of the upper and lower half-shells,
   the step of producing the mould including at least successive sub-steps of:
      partial digital modeling of a mould model according to the prosthesis model, followed by
      additive manufacture of at least the lower half-shell according to the mould model; and
   a step of producing the prosthesis, including at least successive sub-steps of:
      providing at least one artificial tooth,
      positioning the artificial tooth in an accommodation of the lower half-shell,
      assembling the mould, and
      casting a filling material in the mould,
   wherein the mould is a partial prosthesis mould, the gum part and the tooth part each being partial,
   wherein the positioning member comprises at least one support member configured to support a third imprint of existing teeth, the support member formed of one or more plates and abutments, said plates and abutments mounted on and extending from a support plate, said plates and abutments presenting top surfaces that fit against correspondent lower surfaces of the third imprint of the existing teeth when assembled with the upper half-shell, and
   wherein the positioning member is formed as a complementarity of both of the second imprint of the gum part of the upper half-shell and the third imprint of the existing teeth of the upper half-shell, and of both of the first imprint of the tooth part and the support member of the lower half-shell.

2. The method according to claim 1, wherein the sub-step of additive manufacture of the mould is carried out by photopolymerisation.

3. The method according to claim 2, wherein the sub-step of additive manufacture of the mould is carried out by a method comprising a succession of additions of material by jets on a printing substrate, layerwise, the polymer being solidified by photopolymerisation after each jet.

4. The method according to claim 2, wherein the additive manufacture material of said additive manufacture is selected from the group consisting of:
   acrylic monomers, epoxide monomers, and acrylonitrile butadiene styrene.

5. The method according to claim 1, wherein the sub-step of additive manufacture of the mould is carried out by a succession of additions of material by jets on a printing substrate, layerwise, the polymer being solidified by photopolymerisation after each jet.

6. The method according to claim 5, wherein the additive manufacture material of said additive manufacture is selected from the group consisting of: acrylic monomers, epoxide monomers, and acrylonitrile butadiene styrene.

7. The method according to claim 1, wherein additive manufacture material of said additive manufacture is selected from the group consisting of: acrylic monomers, epoxide monomers, and acrylonitrile butadiene styrene (ABS).

8. The method according to claim 1, wherein additive manufacture material of said additive manufacture is selected from the group consisting of: polylactic acid polymers (PLA), polyvinyl alcohol (PVA), acrylonitrile butadiene styrene (ABS), and ethylene terephthalate (PET).

9. The method according to claim 1, wherein the filling material is an acrylic monomer.

10. The method according to claim 1, wherein the positioning member is completed by cobalt-chrome metal (22) so as to provide sealing of the mould.

11. The method according to claim 1, wherein the step of producing the prosthesis is preceded by a step of taking an imprint.

12. The method according to claim 1, wherein the step of producing the prosthesis is followed by at least one step of removing the prosthesis from the mould and/or finishing.

13. The method according to claim 1, wherein the additive manufacture material of said additive manufacture is an acrylic monomer.

* * * * *